(12) United States Patent
Chang et al.

(10) Patent No.: US 7,167,319 B1
(45) Date of Patent: Jan. 23, 2007

(54) ZOOM LENS SYSTEM

(75) Inventors: Kuo-Wen Chang, Hsinchu (TW); Ming-Sen Tsao, Hsinchu (TW)

(73) Assignee: Foxlink Image Technology Co., Ltd., Hsinchu (TW)

( * ) Notice: Subject to any disclaimer, the term of this patent is extended or adjusted under 35 U.S.C. 154(b) by 0 days.

(21) Appl. No.: 11/251,691

(22) Filed: Oct. 15, 2005

(51) Int. Cl.
*G02B 15/14* (2006.01)

(52) U.S. Cl. ...................... 359/686; 359/676

(58) Field of Classification Search ............... 359/686, 359/676
See application file for complete search history.

(56) References Cited

U.S. PATENT DOCUMENTS 5,999,329 A * 12/1999 Ohtake ...................... 359/686
6,233,099 B1    5/2001 Itoh \* cited by examiner

*Primary Examiner*—Scott J. Sugarman
*Assistant Examiner*—Darryl J. Collins

(57) ABSTRACT

A stepwise variable zoom lens system includes, in order from an object side, a first lens group with a negative refractive power, a second lens group with a positive refractive power, a third lens group with a negative refractive power and a fourth lens group with a positive refractive power. Each of the first lens group, the third lens group and the fourth lens group is constructed from a single block. The first lens group and the fourth lens group are fixed. The second lens group and the third lens group are moveable to be selectively positioned at the wide-angle zoom position and the telephoto zoom position for zooming. The third lens group is finely adjustable for focusing when the object is positioned in different distance.

8 Claims, 16 Drawing Sheets

ZOOM LENS SYSTEM

BACKGROUND OF THE INVENTION

1. Field of the Invention

The present invention generally relates to a zoom lens system, and more particularly to a stepwise variable zoom lens system which has a short overall length and is suitable for compact electronic equipments.

2. The Related Art

In recent years, compact electronic equipments with photographic function, such as simple cameras, mobile phones and personal digital assistants (PDA), have been more and more popular. These compact electronic equipments have become so small that they require zoom lens systems to be configured therein be as short as possible in overall length and as simple as possible in structure.

U.S. Pat. No. 6,233,099 issued on May 15, 2001 discloses a zoom lens system which has a first lens group having a negative refractive power, a second lens group having a positive refractive power, a third lens group having a negative refractive power, and a fourth lens group having a positive refractive power in order from an object side. During zooming from the wide-angle zoom position to the telephoto zoom position, all the lens groups move along an optical axis in such a manner that the separation between the first lens group and second lens group decreases, the separation between the second lens group and the third lens group increases and the separation between the third lens group and the fourth lens group decreases. Because all the lens groups are made moveable for zooming, the lens system needs a complicate zoom control mechanism, which is not suitable for compact electronic equipments. Furthermore, all the moveable design of the lens groups is detrimental to shorten the overall length and simplify the structure of the lens system. More seriously, the first moveable lens group makes the lens system be easily damaged.

SUMMARY OF THE INVENTION

The present invention is made in view of aforementioned problems and has an object to provide a stepwise zoom lens system which has a short overall length, a simple and compact structure.

To achieve the above object, the present invention provides a stepwise variable zoom lens system comprising, in order from an object side, a first lens group with a negative refractive power, a second lens group with a positive refractive power, a third lens group with negative refractive power, and a fourth lens group with positive refractive power. Each of the first lens group, the third lens group and the fourth lens group is constructed from a single block. The first lens group and the fourth lens group are fixed. The second lens group and the third lens group are moveable to be selectively positioned at the wide-angle zoom position and the telephoto zoom position for zooming. The third lens group is finely adjustable for focusing when the object is positioned in different distance.

According to the mentioned above, Each of the first lens group, the third lens group and the fourth lens group is constructed from a single block, so the zoom lens system is simple and compact in structure. During zooming, the first and the fourth lens groups are fixed relative to the image sensor, therefore the zoom lens system has a fixed and short overall length.

BRIEF DESCRIPTION OF THE DRAWINGS

The present invention will be apparent to those skilled in the art by reading the following description of embodiments thereof, with reference to the attached drawings, in which.

DETAILED DESCRIPTION OF THE PREFERRED EMBODIMENTS

Figure 1:
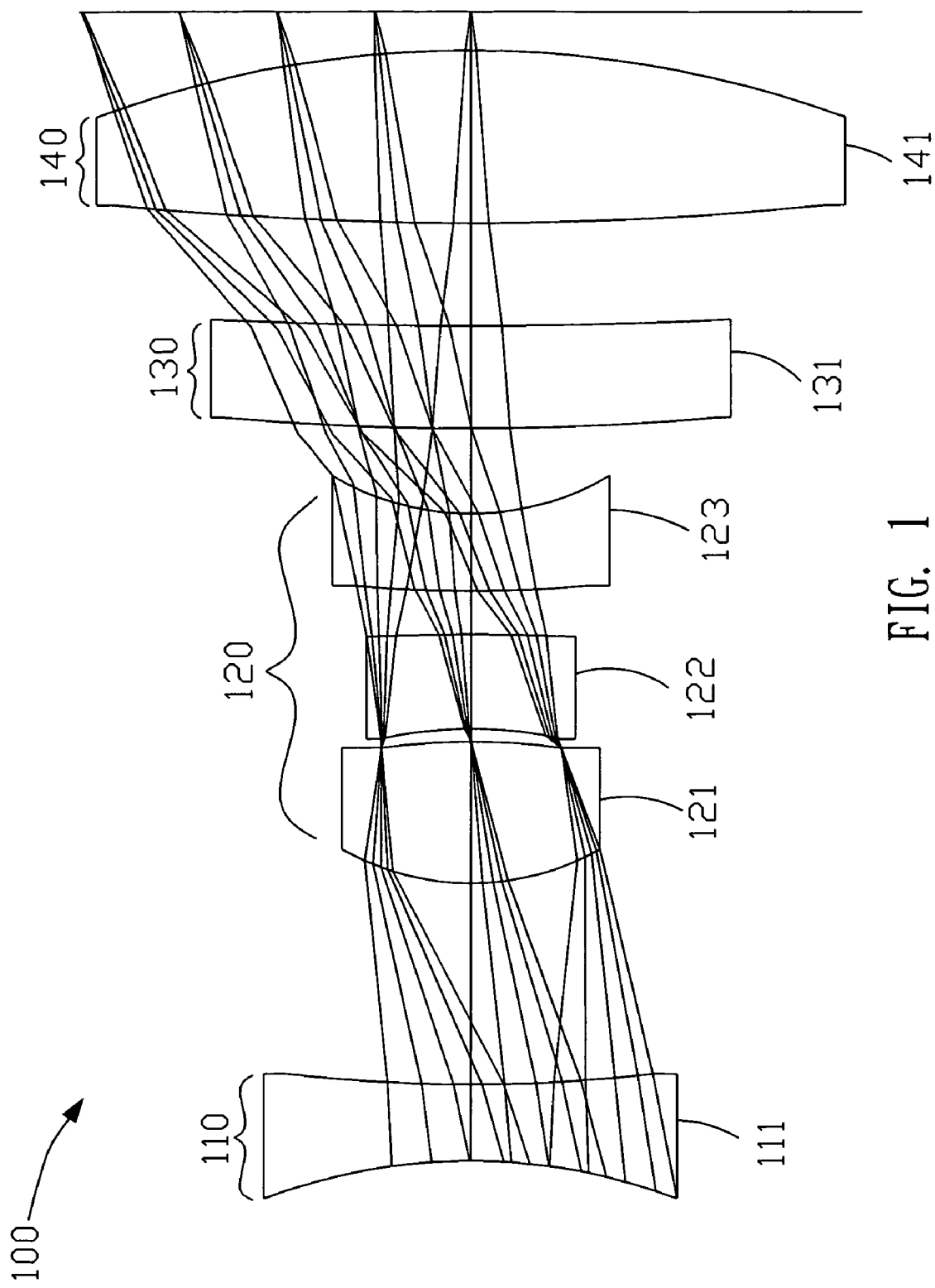
FIG. 1 is a cross-sectional view of a stepwise variable zoom lens system in the wide-angle zoom position of a first embodiment according to the present invention.
Figure 2:
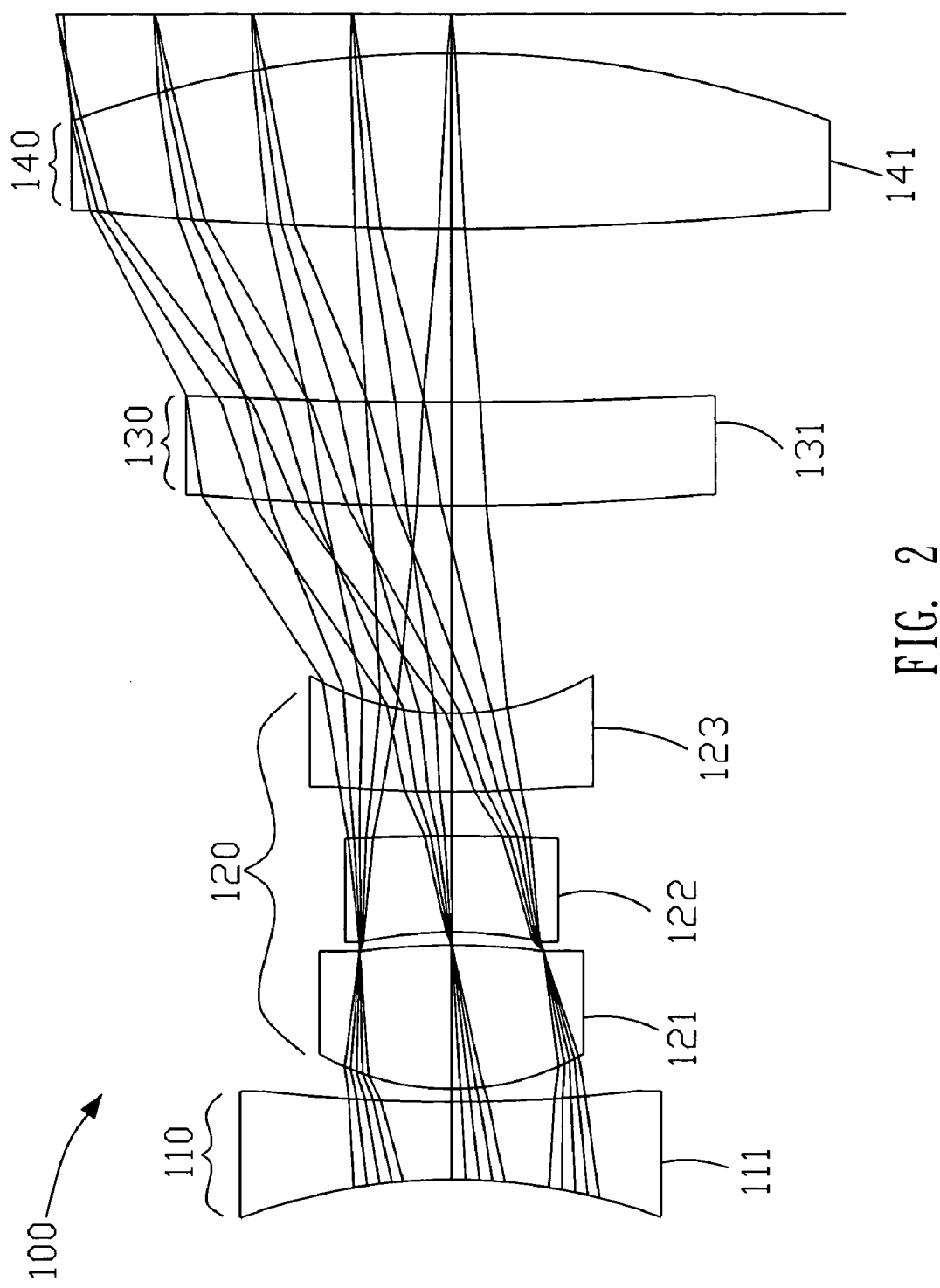
FIG. 2 is a cross-sectional view of the stepwise variable zoom lens system in the telephoto zoom position of the first embodiment according to the present invention.
Figure 3A:
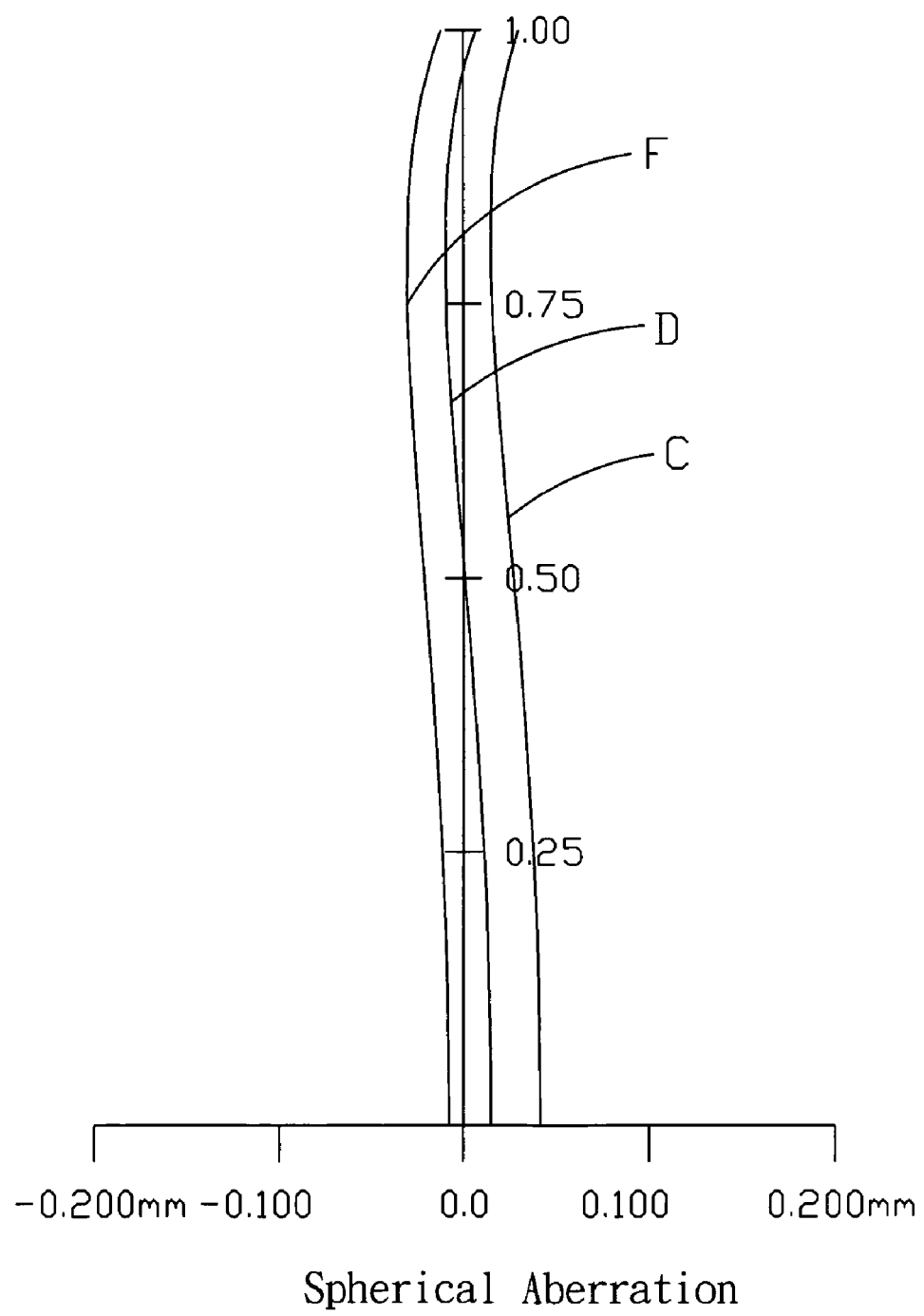
FIGS. 3A–3C show spherical aberration, astigmatism, and distortion, respectively, of the stepwise variable zoom lens system in the wide-angle zoom position according to the first embodiment.
Figure 3B:
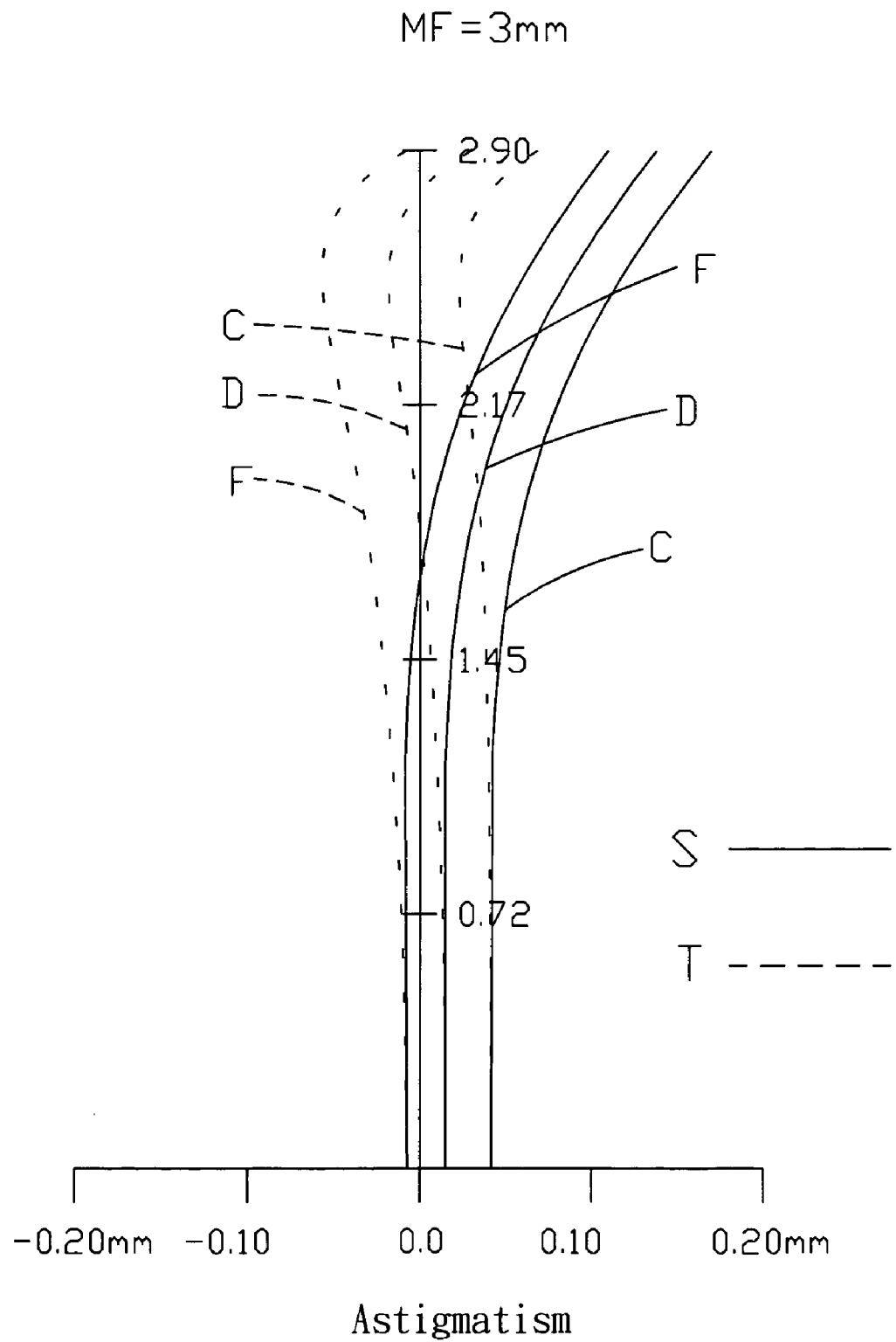
Figure 3C:
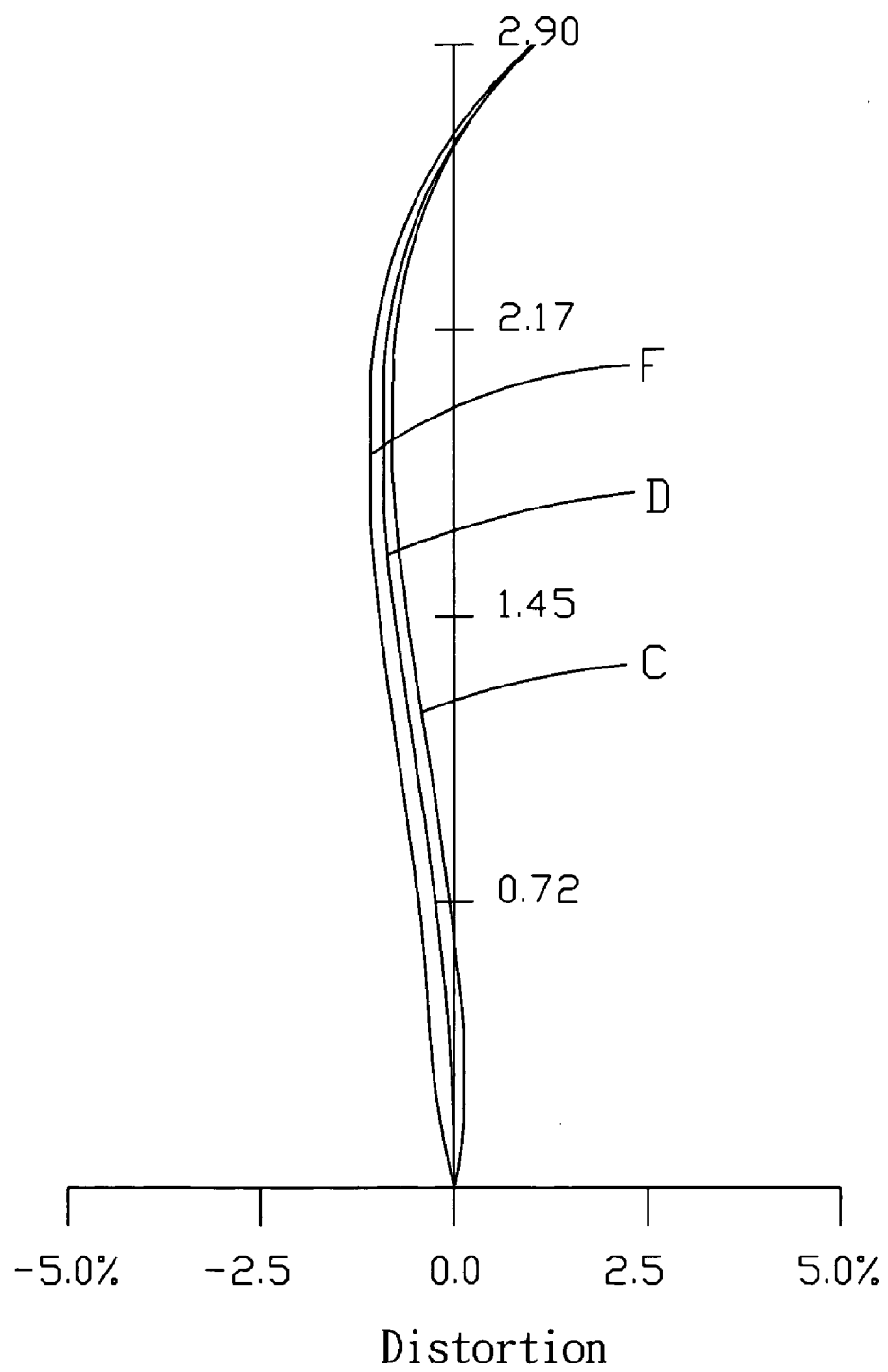
Figure 4A:
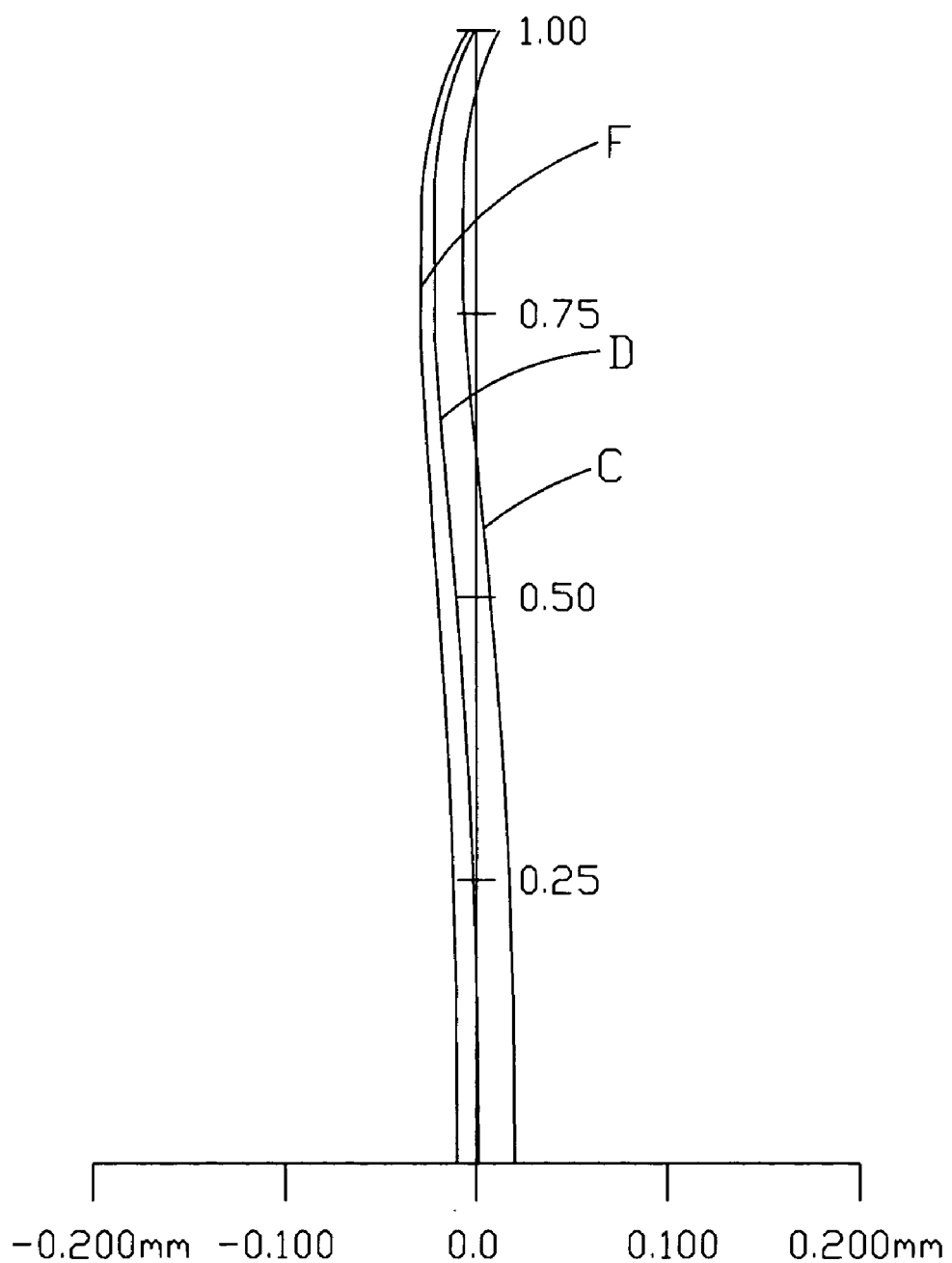
FIGS. 4A–4C show spherical aberration, astigmatism, and distortion, respectively, of the stepwise variable zoom lens system in the telephoto zoom position according to the first embodiment.
Figure 4B:
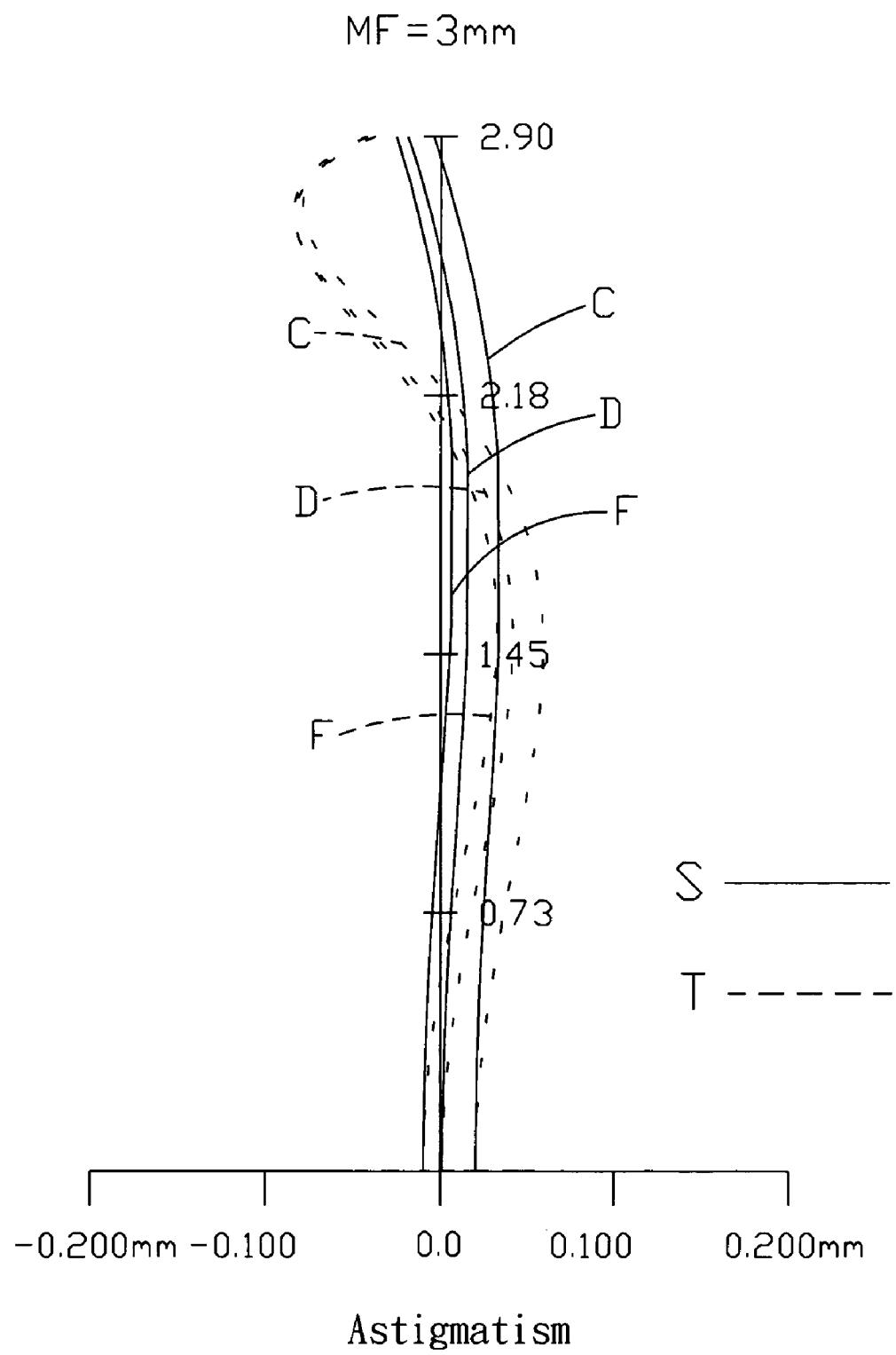
Figure 4C:
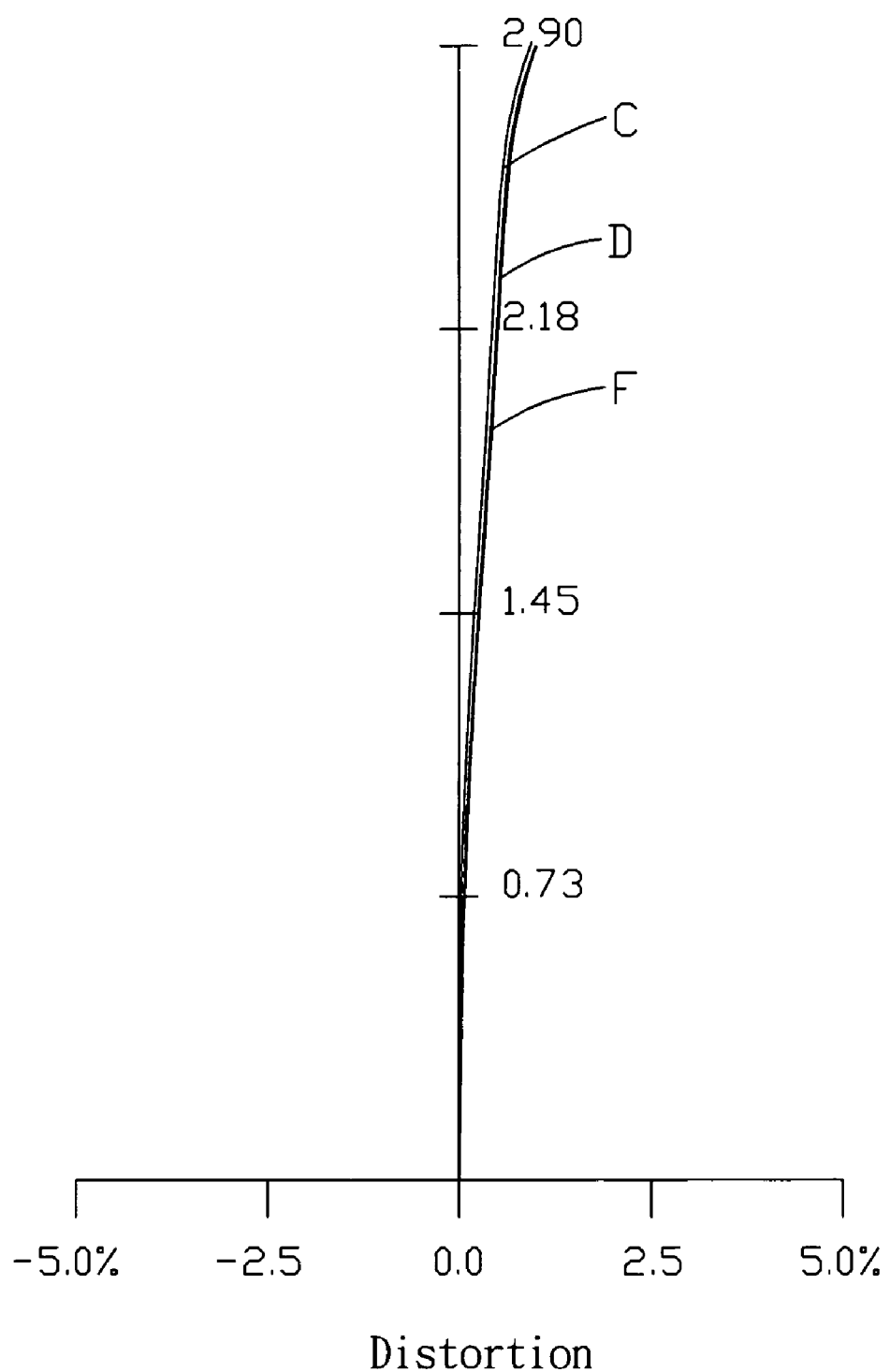

With reference to FIG. 1 and FIG. 2, a first embodiment of a stepwise variable zoom lens system 100 according to the present invention is shown. The stepwise variable zoom lens system 100 comprises, in order from an object side, a first lens group 110 having a negative refracting power, a second lens group 120 having a positive refracting power, a third lens group 130 having a negative refracting power and a fourth lens group 140 having a positive refracting power.

The first lens group 110 is constructed from a single block. The term "single block" is defined as (a) a single lens element or (b) a cemented lens composed of several lens elements cemented together or (c) a hybrid lens composed of a glass lens element and a thin resin lens element pressed together. In the first embodiment, the first lens group 110 is composed of a double concave negative lens 111. The refractive surface of the double concave negative lens 111 facing to the object is spherical surface, and another refractive surface of the double concave negative lens 111 far away from the object is aspheric surface. In order to decrease chromatic aberrations, Abbe number of the double concave negative lens 111 is preferable to be bigger than 50. Each aspheric surface satisfies the following equation:

$$X = \frac{cS^2}{1 + \sqrt{1-(K+1)c^2S^2}} + A_4 S^4 + A_6 S^6 + A_8 S^8 + A_{10} S^{10} + A_{12} S^{12} + \ldots \quad \text{Equation (1)}$$

Wherein c designates a curvature of the aspheric vertex, S designates a distance from the optical axis; K designates the conic coefficient, $A_4, A_6, A_8, A_{10}, A_{12}$ ... designate the fourth, sixth, eighth, tenth, twelfth, ... aspheric coefficients, and X designates the sag of a line drawn from a point on the aspheric lens surface at a distance S from the optical axis to the tangential plane of the aspheric surface vertex.

The second lens group 120 is composed of three lens elements, which are, in order from an object side, a double-convex lens element 121 having a positive refracting power, a concave-convex lens element 122 having negative refracting power, and a convex-concave lens element 123 having a negative refracting power. In order to decrease the aberration, both refractive surfaces of the third convex-concave lens element 123 are aspheric surfaces. Each aspheric surface also satisfies the Equation (1). The second lens group 120 further comprises an aperture (not shown in the figures) which is attached to a refractive surface of the double-convex lens element 121 facing to the object. The aperture moves together with the second lens group 120.

The third lens group 130 is constructed from a single block. The single block is composed of a concave-convex negative lens 131. Both refractive surfaces of the concave-convex negative lens 131 are aspheric surfaces. Each aspheric surface also satisfies the Equation (1).

The fourth lens group 140 is constructed from a single block. The single block is composed of a double-convex positive lens 141. The fourth lens group 140 is used to improve the telecentricity. The fourth lens group 140 is fixed. The fourth lens group 140 can protect the image sensor.

Table 1 below lists the surface number, in order from the object side, the radius of curvature R (in mm) of each optical surface at the optical axis, the distance $d_1$ (in mm) between vertexes of adjacent optical surfaces when the second lens group 120 is disposed in the first position, the distance $d_2$ (in mm) between vertexes of adjacent optical surfaces when the second lens group 120 is disposed in the second position, the Abbe number v, and the refractive index nd (at the d-line of $\lambda = 587.6$ nm) of each lens element for the first embodiment.

TABLE 1

| Surface | R | $d_1$ | $d_2$ | $n_d$ | v | |
|---|---|---|---|---|---|---|
| 1 | −4.4515 | 0.6000 | | 1.525 | 56.3 | |
| 2 | 11.0505 | 1.5748 | 0.1000 | | | Aspheric |
| 3 | 2.0000 | 1.1118 | | 1.804 | 46.5 | Aperture |
| 4 | −5.2023 | 0.1000 | | | | |
| 5 | −3.2432 | 0.7420 | | 1.805 | 25.5 | |
| 6 | −17.5112 | 0.3391 | | | | |
| 7 | 2.9675 | 0.6072 | | 1.607 | 27.6 | Aspheric |
| 8 | 1.5177 | 0.6651 | 1.6060 | | | Aspheric |
| 9 | −9.0822 | 0.8000 | | 1.525 | 56.3 | Aspheric |
| 10 | −50.9269 | 0.8051 | 1.3391 | | | Aspheric |
| 11 | 26.5590 | 1.3548 | | 1.805 | 25.5 | |
| 12 | −8.2526 | 0.3000 | | | | |

Table 2 below lists the values of the constants K, $A_4$, $A_6$, $A_8$, $A_{10}$ used in Equation (1) above for each of the aspheric lens surfaces of Table 1.

TABLE 2

| Surface | K | $A_4$ | $A_6$ | $A_8$ | $A_{10}$ |
|---|---|---|---|---|---|
| 2 | 39.0062 | −4.05740E−03 | −1.50710E−03 | −1.14035E−04 | 9.22284E−06 |
| 7 | −17.1964 | −1.97602E−02 | −1.22007E−01 | 6.30003E−02 | −4.58731E−02 |
| 8 | −0.1246 | −6.69706E−02 | −6.12734E−02 | 3.53452E−02 | −9.16573E−03 |
| 9 | −10 | 3.67969E−03 | 9.51233E−03 | −1.95842E−03 | 1.69337E−04 |
| 10 | −10 | −6.79528E−03 | 4.30880E−03 | −7.83427E−04 | 1.17297E−04 |

With reference to FIG. 1 and FIG. 2 again, the zooming process of the stepwise variable zoom lens system 100 is shown in the following.

In the present invention, the first lens group 110 and the fourth lens group 140 do not move relatively to the image sensor, and the second and third lens group 120 and 130 are moved forward and back for zooming. The third lens group 130 is finely adjustable for focusing when the object is positioned in different distance. When zooming, the second lens group 120 and the third lens group 130 are moveable to be selectively positioned at the wide-angle zoom position and the telephoto zoom position. By moving the second lens group 120 and the third lens group 130 from one position to the other, the focal length of the stepwise variable zoom lens system 100 is changed. This zoom mode that only choose several discrete zoom positions is different from the continuous zoom mode. In the present embodiment, the first position shows the wide-angle end, as shown in FIG. 1, and the second position shows the telephoto end, as shown in FIG. 2.

In the first embodiment, the focal length of each lens group is following:
$f_1 = -5.9428$,
$f_2 = 2.8059$,
$f_3 = -21.1167$,
$f_4 = 7.8855$, Wherein $f_1$ denotes the focal length of the first lens group 110, $f_2$ denotes the focal length of the second lens group 120, $f_3$ denotes the focal length of the third lens group 130, $f_4$ denotes the fourth lens group 140.

FIGS. 3A–3C and FIGS. 4A–4C show spherical aberration, astigmatism, and distortion, respectively, of the stepwise variable zoom lens system 100 in the first position and the second position, respectively, according to the first embodiment. PR in FIGS. 3A and 4A denotes the pupil semi-radius of the stepwise variable zoom lens system 100. MF in FIGS. 3B–3C and 4B–4C denotes the maximum field of the stepwise variable zoom lens system 100. In FIGS. 3A–3C and FIGS. 4A–4C, D, F, and C denote D-line ($\lambda = 546.0740$ nm), F-line ($\lambda = 486.1327$ nm) and C-line ($\lambda = 632.8000$ nm) respectively. A solid line S shows astigmatism in the sagittal image, and a broken line T shows astigmatism in the tangential image.

Figure 5:
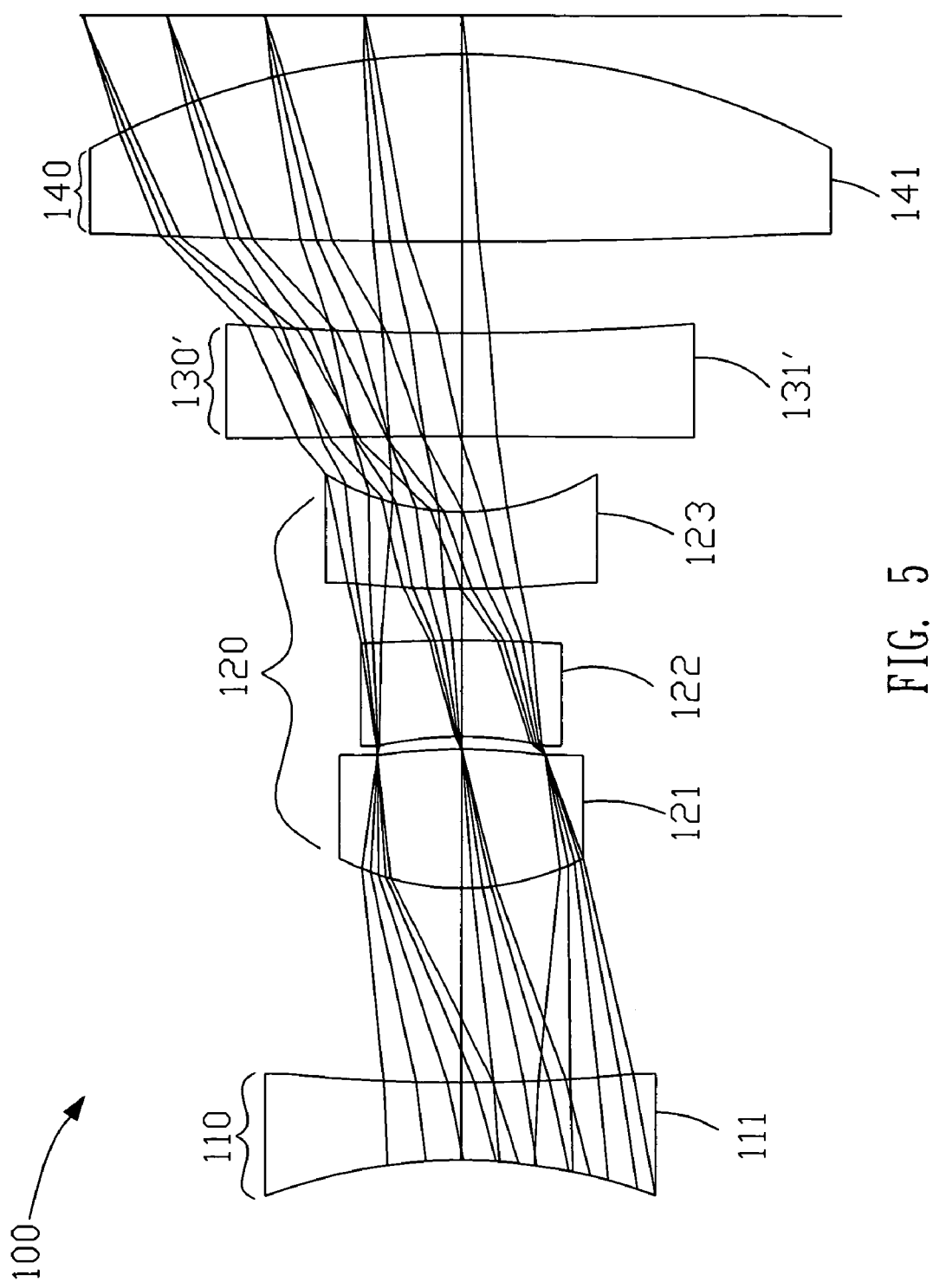
FIG. 5 is a cross-sectional view of a stepwise variable zoom lens system in the wide-angle zoom position of a second embodiment according to the present invention.
Figure 6:
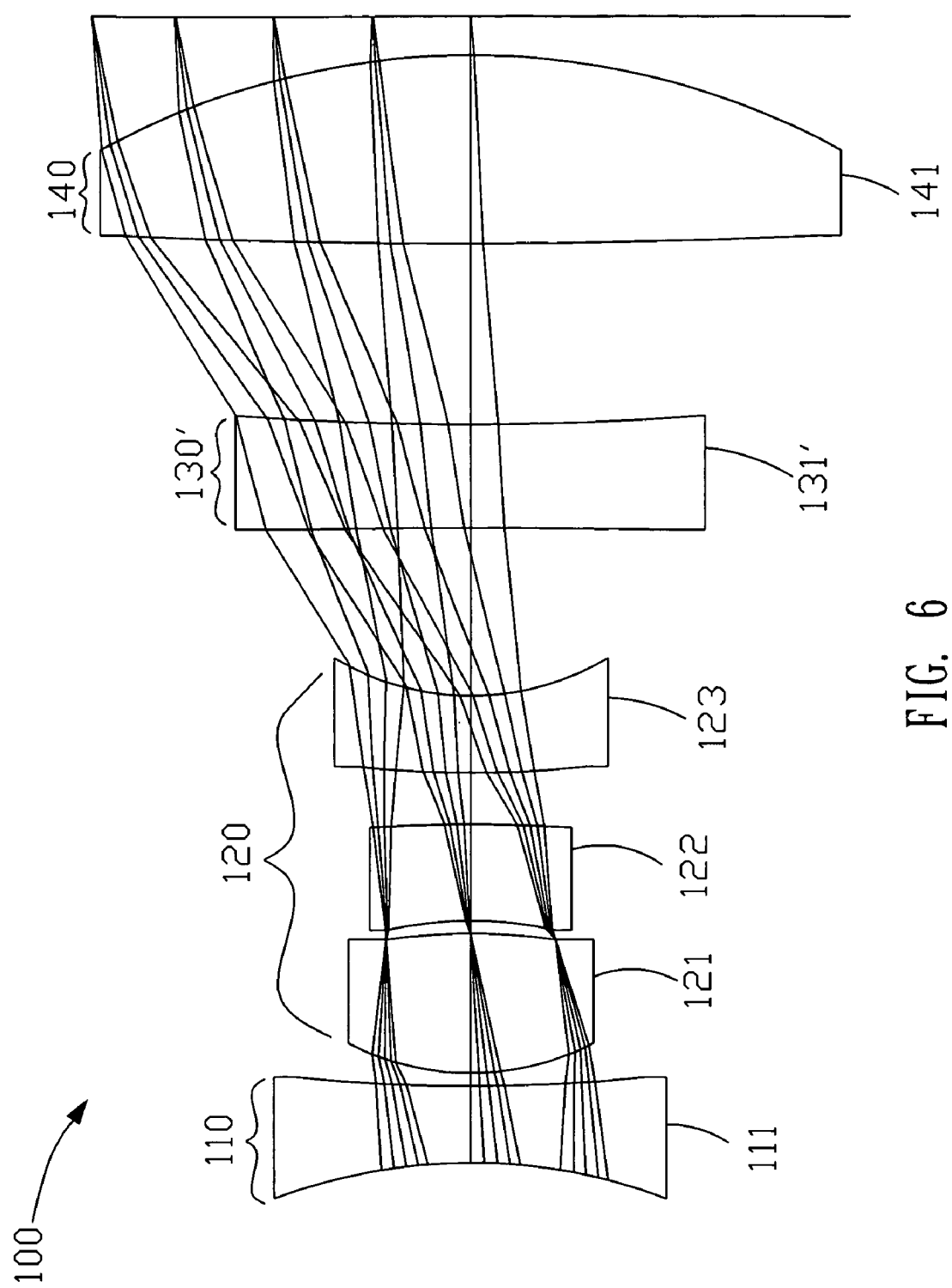
FIG. 6 is a cross-sectional view of the stepwise variable zoom lens system in the telephoto zoom position according to the second embodiment.
Figure 7A:
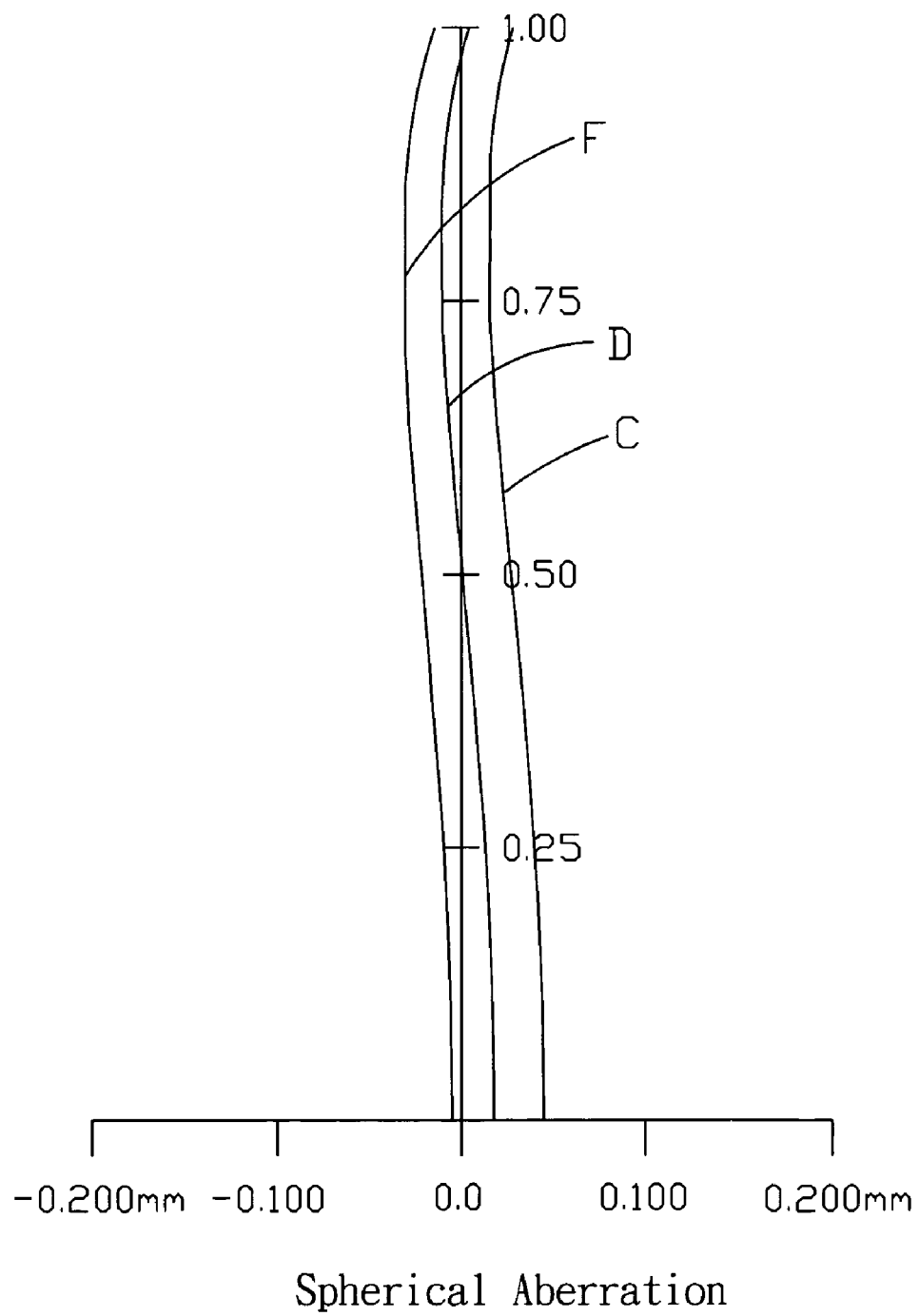
FIGS. 7A–7C show spherical aberration, astigmatism, and distortion, respectively, of the stepwise variable zoom lens system in the wide-angle zoom position according to the second embodiment.
Figure 7B:
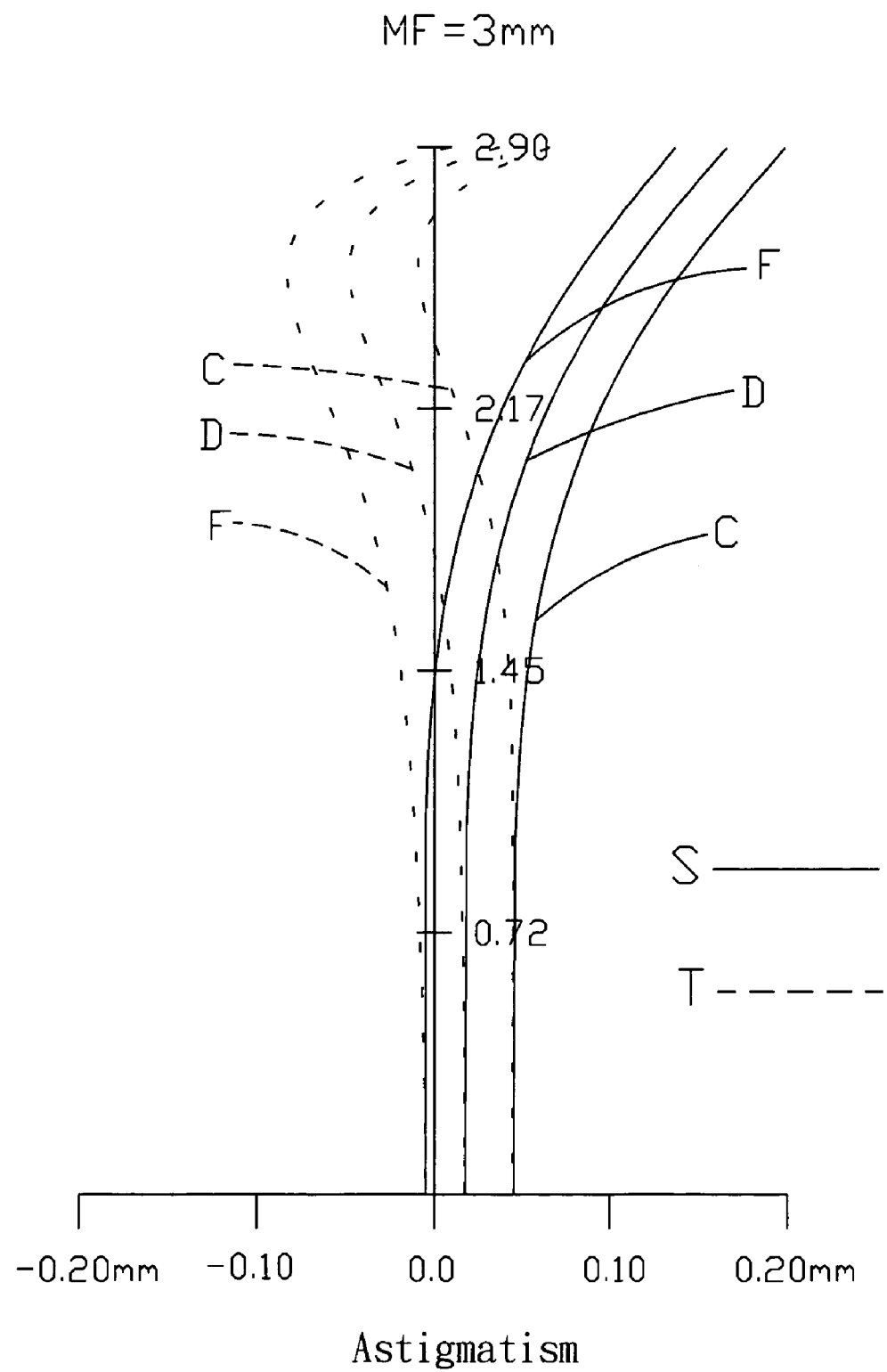
Figure 7C:
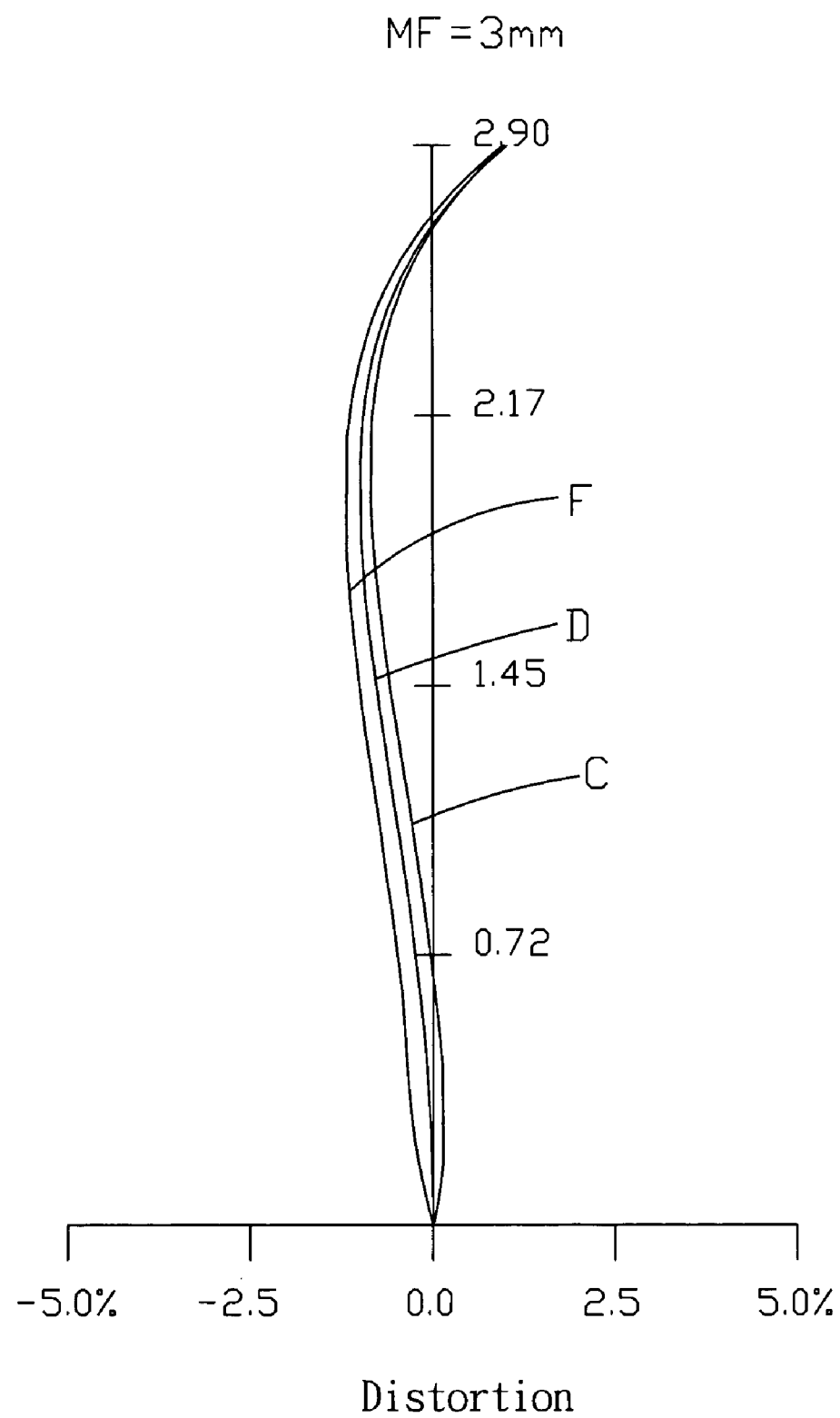
Figure 8A:
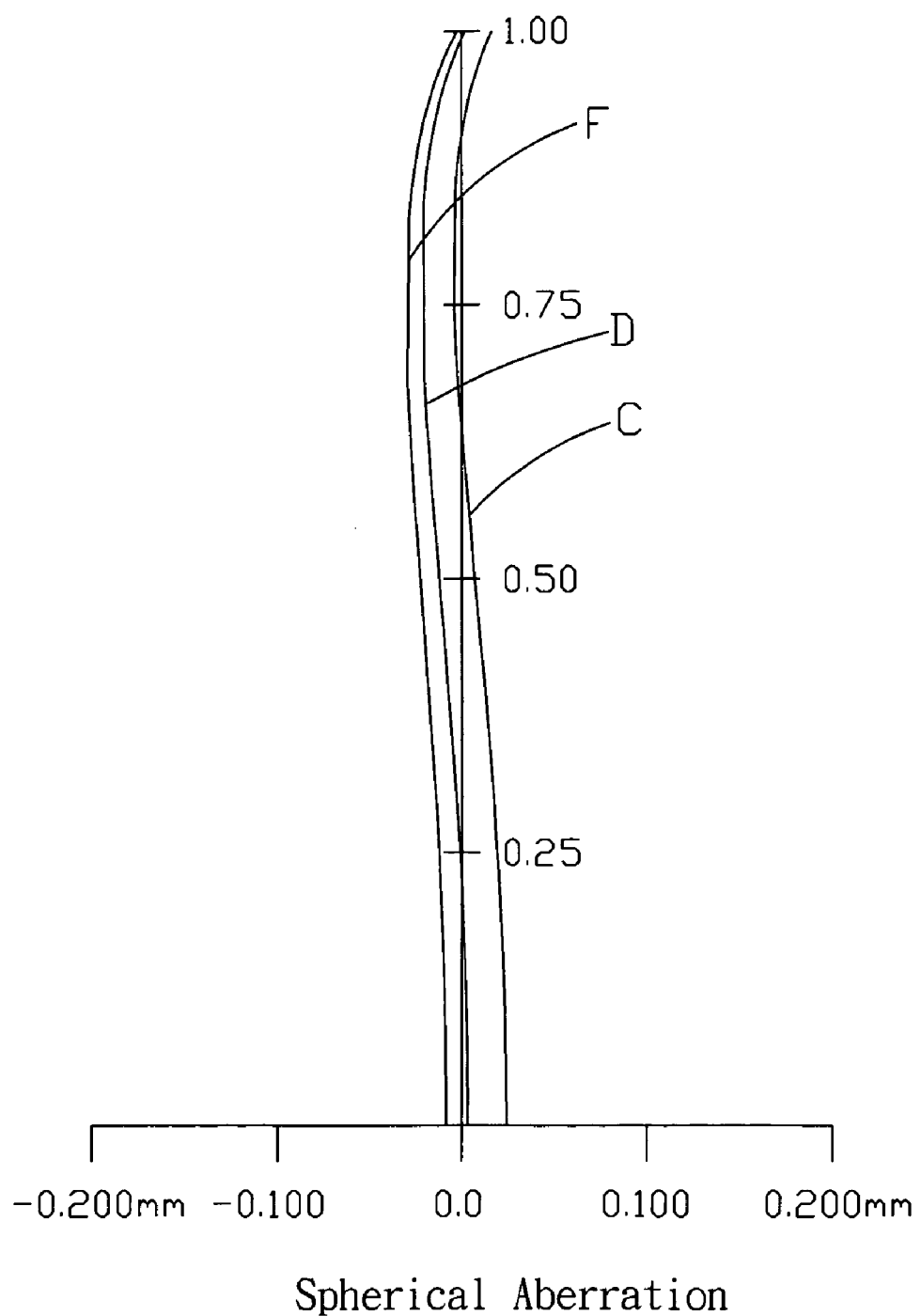
FIGS. 8A–8C show spherical aberration, astigmatism, and distortion, respectively, of the stepwise variable zoom lens system in the telephoto zoom position according to the second embodiment.
Figure 8B:
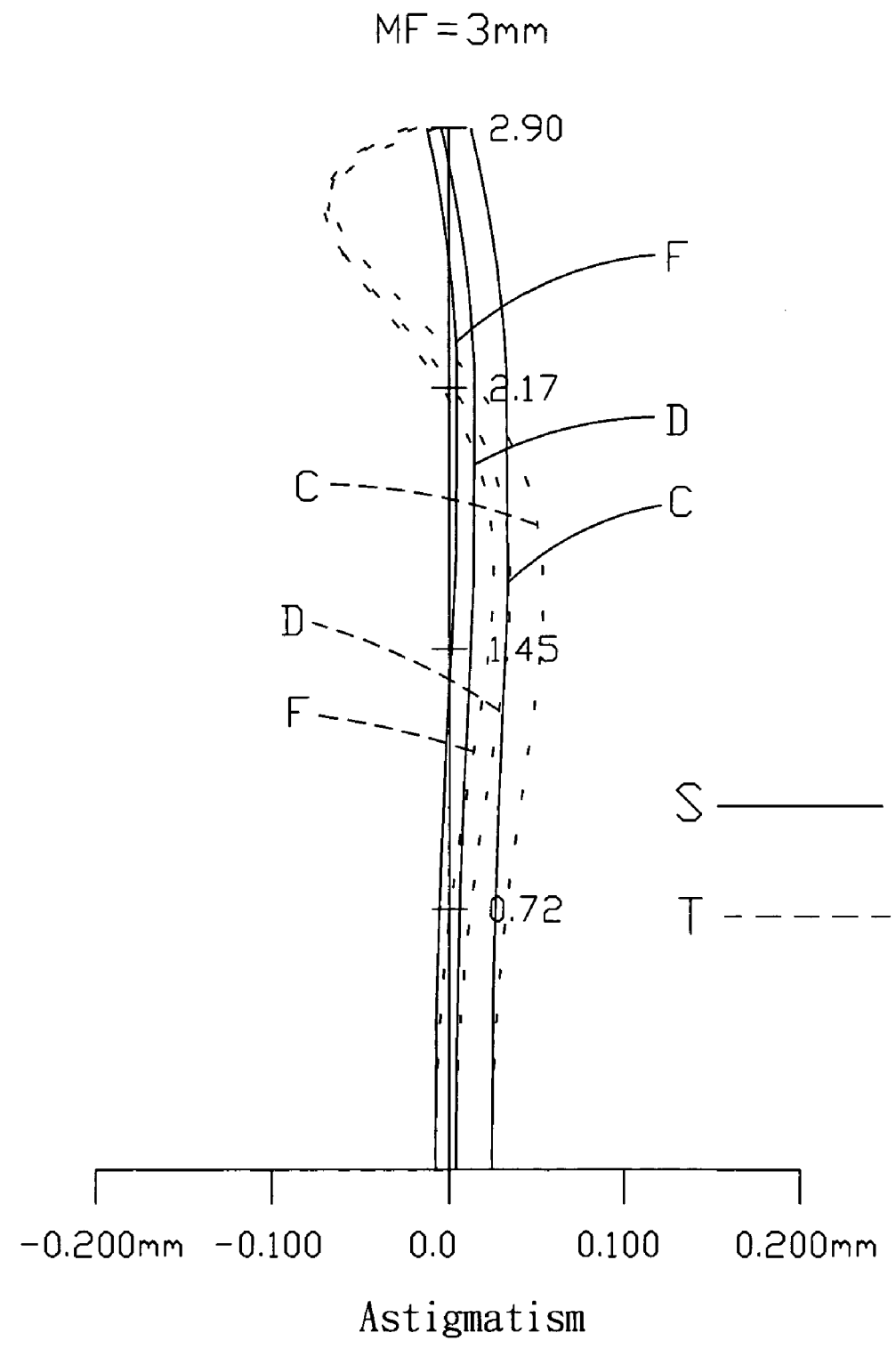
Figure 8C:
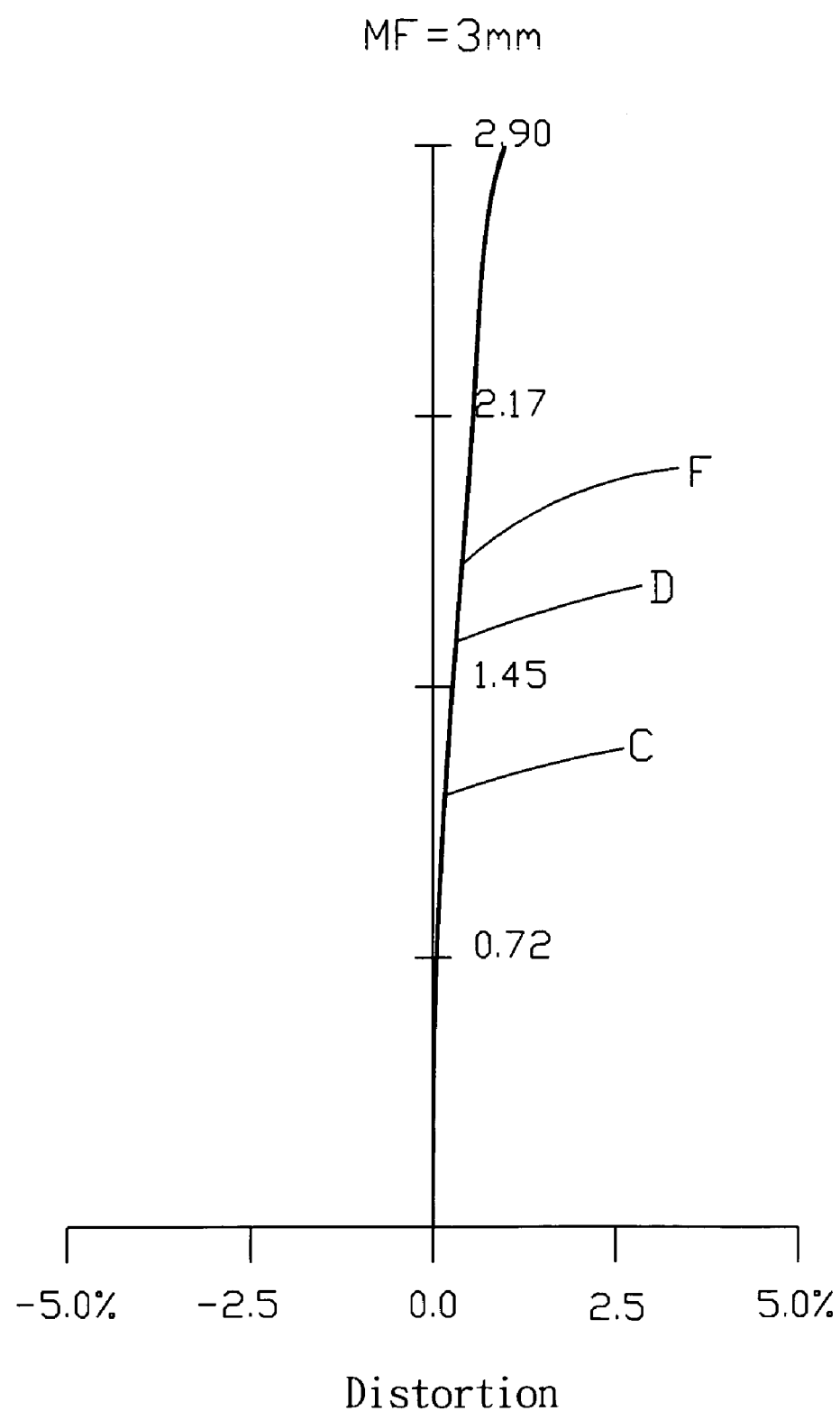

With reference to FIG. 5 and FIG. 6, a second embodiment is shown. The stepwise variable zoom lens system 100 in the present embodiment is similar to that shown in the first embodiment. The difference between the first embodiment and the second embodiment is that the first lens unit 131' of the third lens group 130' in the second embodiment is a double-concave negative lens.

Various values of the second embodiment are list in Table 3 and Table 4, wherein the same symbols stand for the same meanings as shown in the first embodiment.

TABLE 3

| Surface | R | $d_1$ | $d_2$ | $n_d$ | v | |
|---|---|---|---|---|---|---|
| 1 | −4.1496 | 0.6000 | | 1.525 | 56.3 | |
| 2 | 12.0411 | 1.5137 | 0.1000 | | | Aspheric |
| 3 | 2.0000 | 1.0825 | | 1.804 | 46.5 | Aperture |
| 4 | −4.5897 | 0.1000 | | | | |
| 5 | −2.9064 | 0.7500 | | 1.805 | 25.5 | |
| 6 | −11.7521 | 0.3991 | | | | |
| 7 | 2.8700 | 0.6000 | | 1.607 | 27.6 | Aspheric |
| 8 | 1.4902 | 0.5859 | 1.3036 | | | Aspheric |
| 9 | −7.3170 | 0.8000 | | 1.525 | 56.3 | Aspheric |
| 10 | 83.5899 | 0.7094 | 1.4054 | | | Aspheric |
| 11 | 58.3954 | 1.4593 | | 1.805 | 25.5 | |
| 12 | −5.8623 | 0.3000 | | | | |

Table 4 below lists the values of the constants K, $A_4$, $A_6$, $A_8$, $A_{10}$ used in Equation (1) above for each of the aspheric lens surfaces of Table 3.

TABLE 4

| Surface | K | $A_4$ | $A_6$ | $A_8$ | $A_{10}$ |
|---|---|---|---|---|---|
| 2 | 18.5534 | −1.69078E−03 | −1.18934E−03 | −1.35367E−04 | 1.72931E−04 |
| 7 | −13.3166 | −2.39933E−02 | −1.19464E−01 | 5.96592E−02 | −4.63294E−02 |
| 8 | 0.047888 | −5.95527E−02 | −8.94148E−02 | 5.08341E−02 | −1.54165E−02 |
| 9 | −10 | 1.59720E−02 | 4.12035E−03 | −5.30247E−04 | 3.38511E−05 |
| 10 | −10 | 6.63994E−04 | 1.74196E−03 | −5.73486E−04 | 1.38850E−04 |

In the second embodiment, the focal length of each lens group is following:
$f_1 = -5.78$,
$f_2 = 2.70$,
$f_3 = -12.73$,
$f_4 = 6.62$,
Wherein $f_1$ denotes the focal length of the first lens group 110, $f_2$ denotes the focal length of the second lens group 120, $f_3$ denotes the focal length of the third lens group 130', $f_4$ denotes the fourth lens group 140.

FIGS. 7A–7C and FIGS. 8A–8C show spherical aberration, astigmatism, and distortion, respectively, of the stepwise variable zoom lens system 100 in the first position and the second position, respectively, according to the second embodiment. The same symbols in those figures stand for the same meanings as shown in the first embodiment.

While the present invention has been described with reference to special embodiments, therefore the description is illustration and is not to be constructed as limiting the invention, Various modifications to the present invention may be made to the preferred embodiments by those skilled in art without departing from the true spirit or scope of the invention as defined by the appended claim.

What is claimed is:

1. A stepwise variable zoom lens system, in order from an object side, comprising:
    a first lens group of negative refracting power;
    a second lens group of positive refracting power;
    a third lens group of negative refracting power; and
    a fourth lens group of positive refracting power;
    wherein each of the first lens group, the third lens group and the fourth lens group is constructed from a single block, the first lens group and the fourth lens group are fixed, the second lens group and the third lens group are moveable to be selectively positioned at the wide-angle zoom position and the telephoto zoom position for zooming, the third lens group is finely adjustable for focusing when the object is positioned in different distance.

2. The stepwise variable zoom lens system as claimed in claim 1, wherein the first lens group is composed of a double concave negative lens, a refractive surface of the double concave negative lens facing to the object is spherical surface, and another refractive surface of the double concave negative lens far away from the object is aspheric surface.

3. The stepwise variable zoom lens system as claimed in claim 1, wherein the second lens group comprises a double-convex lens element having a positive refracting power, a concave-convex lens element having a negative refracting power, and a convex-concave lens element having a negative refracting power.

4. The stepwise variable zoom lens system as claimed in claim 3, wherein both refractive surfaces of the convex-concave lens element of the second lens group are aspheric surfaces.

5. The stepwise variable zoom lens system as claimed in claim 3, wherein the second lens group further comprises an aperture attached to a refractive surface of the double-convex lens element facing to the object, and the aperture moves together with the second lens group.

6. The stepwise variable zoom lens system as claimed in claim 1, wherein the third lens group is composed of a double-concave negative lens, both refractive surfaces of the double-concave negative lens are aspheric surfaces.

7. The stepwise variable zoom lens system as claimed in claim 1, wherein the third lens group is composed of a concave-convex negative lens, both refractive surfaces of the concave-convex negative lens are aspheric surfaces.

8. The stepwise variable zoom lens system as claimed in claim 1, wherein the fourth lens group is composed of a double-convex positive lens.

* * * * *